J. AND W. E. WATKINS.
AIR AGITATING APPARATUS.
APPLICATION FILED NOV. 15, 1920.
1,436,553.
Patented Nov. 21, 1922.
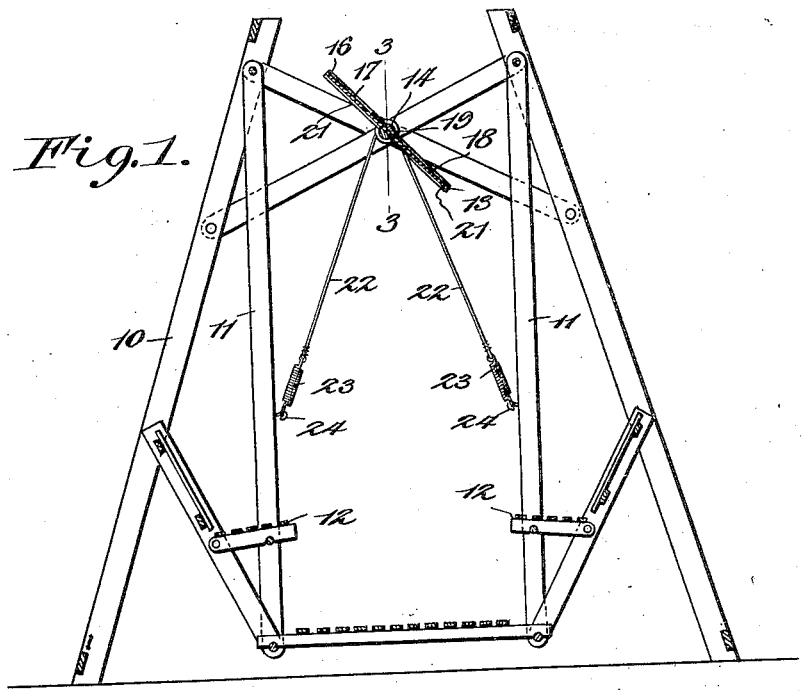
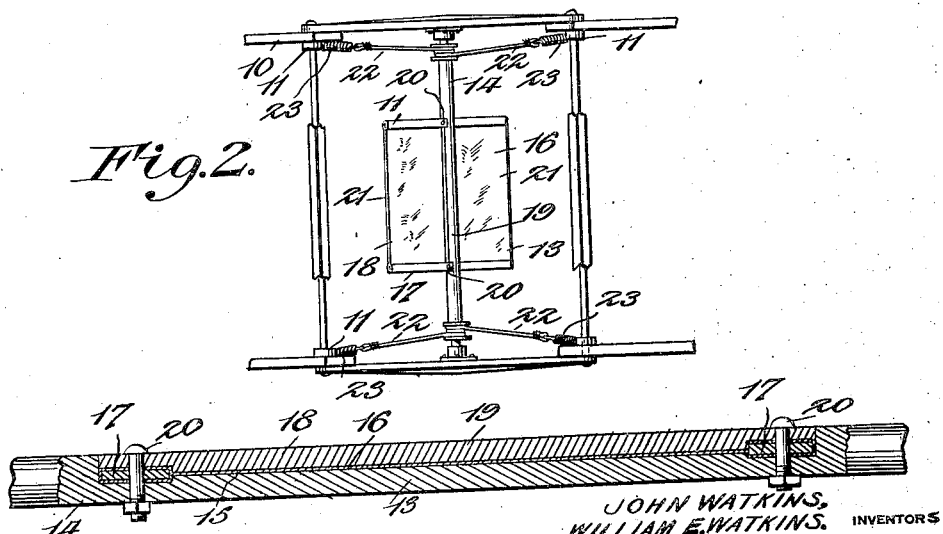
JOHN WATKINS.
WILLIAM E. WATKINS. INVENTORS Patented Nov. 21, 1922.

1,436,553

UNITED STATES PATENT OFFICE.

JOHN WATKINS AND WILLIAM EDWIN WATKINS, OF MILMAY, NEW JERSEY.

AIR-AGITATING APPARATUS.

Application filed November 15, 1920. Serial No. 424,196.

*To all whom it may concern:*

Be it known that we, JOHN WATKINS and WILLIAM EDWIN WATKINS, citizens of the United States, residing at Milmay, in the county of Atlantic and State of New Jersey, have invented new and useful Improvements in Air-Agitating Apparatus, of which the following is a specification.

This invention relates to air agitating apparatus.

More particularly the invention relates to fans for lawn swings or the like.

Some of the objects of the present invention are: to produce a simple, inexpensive air agitating device which is novel in construction and operation; to equip a lawn swing or the like with an air agitating device or fan so as to derive extra comfort; to equip a lawn swing or the like with a fan which is reversible so as to precepitate air currents in opposite directions. With these and other objects in view the invention resides in the particular provision, combination and relative arrangement of parts more fully described in the following specification and illustrated in the accompanying drawing, in which:

Figure 1 is a central vertical sectional view of a lawn swing and showing the application of the present invention thereto.

Figure 2 is a top plan view.

Figure 3 is transverse sectional view on the line 3—3, Figure 1.

Referring now to the drawing it will be manifest that, there has been shown a lawn swing which is equipped with the device of the present invention.

The lawn swing comprises a derrick or upright frame 10, hangers 11 which are supported for oscillatory movement on the said frame, and seats 12 which are carried by the hangers 11. As is known the hangers and the seats essentially form movable parts, and such parts are utilized to form a part of the present invention.

An air agitating device 13 which is the important part of the present invention comprises a shaft 14 mounted for rotation in suitable bearings carried by braces forming a part of the frame 10. The shaft 14 is cut out as at 15 to receive the fan 16. The fan 16 consists preferably of members 17—17 to which a piece of fabric 18 or its equivalent is attached. The fan 16 is held in place upon the shaft 14 by a member 19 and bolts 20. The member 19 is of such configuration as to accommodate the parts of the fan 16 and so as to fit in the cut out portion 15. Under such arrangement of parts blades 21—21 will be afforded and such blades will be on opposite sides of the shaft 14. Belts 22—22 are employed as a driving connection between the hangers 11 and the shaft 14. Each belt 22 midway of its length is wound preferably twice about the shaft 14. A tensile spring 23 is attached to each of the free ends of the belts 22—22. The free ends of the springs 23 are connected to hooks 24 which are secured to the hangers 11.

From the foregoing description of the provision and relative arrangement of parts, it will be manifest that, as the seats 12 are moved back and forth, and as the hangers are therefore made to oscillate, the belts 22—22 will effect reversible rotation of the shaft 14. It follows that the fan 16 will also have reversible motion. Air currents will be created and the air will be alternately precipitated toward one seat and then the other. The springs 23 serve to hold the belts taut, and also prevent jerky motion of the fan 16 immediately prior to its being reversed from one direction of rotation to another.

While there has been shown the preferred embodiment of the invention, it is to be understood that any and all changes and modifications within the scope of the claims hereunto appended may be resorted to whenever it is found necessary or desirable.

What is claimed is:

1. In an apparatus as characterized, a fan comprising a shaft, a blades-member, and means for effecting the detachable attachment of said blades-member; a movable suspended structure, and means for rotating said shaft, said last means including an elastic element connected to said structure.

2. An apparatus as characterized comprising a frame, a fan mounted on said frame, said fan comprising a shaft of separable parts, a blades-member adapted to be held between the said parts of said shaft, and means for holding the parts of the shaft together; a movable suspended structure carried by said frame, and means for rotating said shaft, said last means including belts, and tensile springs connected to the opposite ends of said belts, the said springs being connected to said structure.

3. An apparatus as characterized comprising a stationary frame, a fan mounted, on said frame, said fan comprising a shaft of separable parts, a blades-member adapted to be held between the parts of said shaft, and means for holding the parts of said shaft together in clamping relation to said blades-member; a movable suspended structure having seats carried by said frame, and means for rotating said shaft, said last means comprising spirally grooved wheels carried by one part of said shaft, belts, and springs connected to the opposite ends of said belts and to said structure.

4. For a swing, a rotatable fan comprising a shaft of separable parts, a blades-member adapted to be held between the said parts of said shaft, and means for detachably holding said parts of said shaft together and for holding said blades-member in place in connection with said shaft.

In testimony whereof we hereby affix our signatures.

JOHN WATKINS.
WM. EDWIN WATKINS.